May 29, 1956   W. KOHLHAGEN   2,747,361
SELF-LUBRICATING SHAFT BEARINGS

Filed June 3, 1952   2 Sheets-Sheet 1

Inventor:
Walter Kohlhagen
by: Stewart & Sprugel
Attorneys.

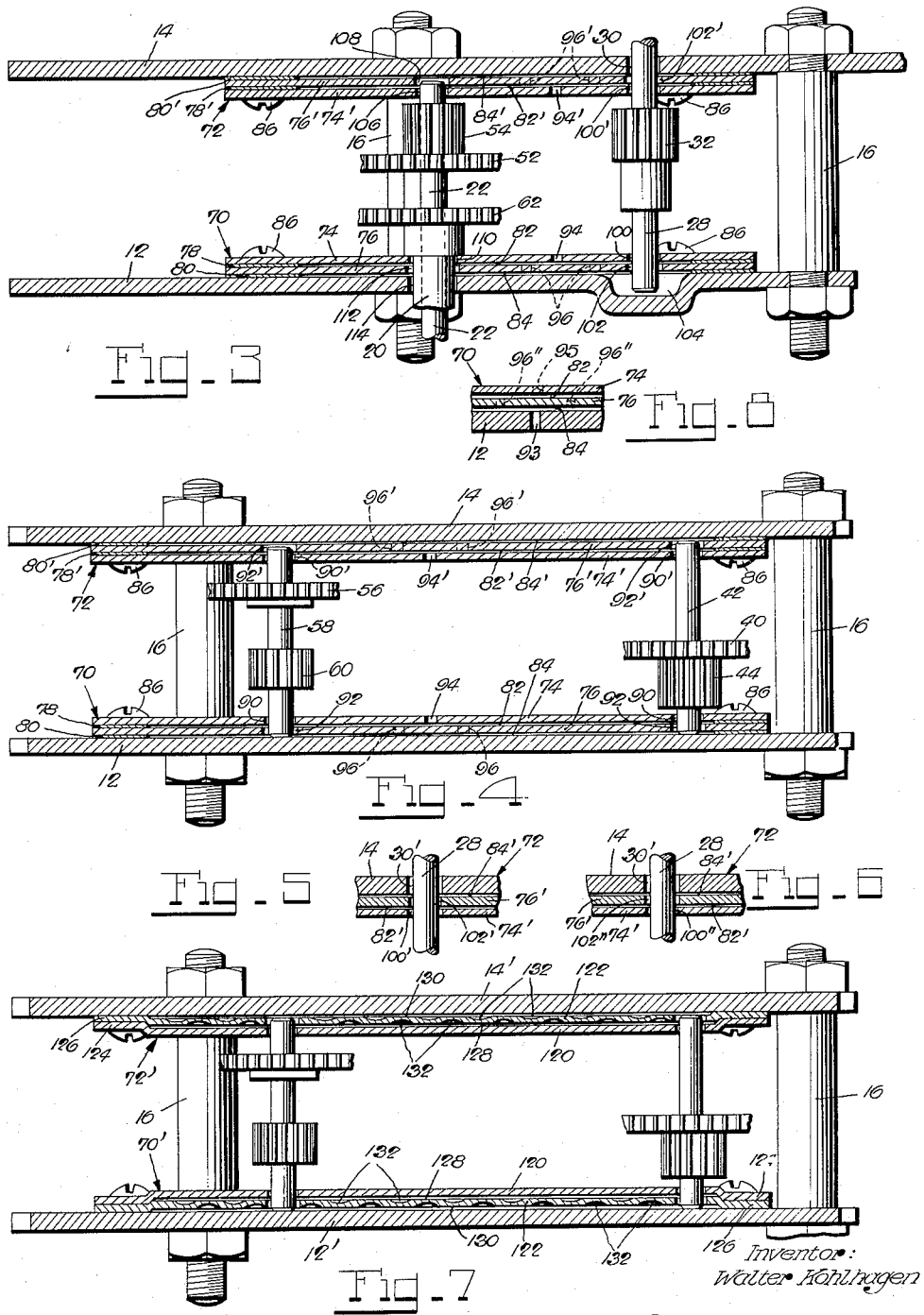

United States Patent Office 2,747,361
Patented May 29, 1956

2,747,361
SELF-LUBRICATING SHAFT BEARINGS

Walter Kohlhagen, Elgin, Ill., assignor to The E. Ingraham Company, Bristol, Conn., a corporation of Connecticut Application June 3, 1952, Serial No. 291,465

6 Claims. (Cl. 58—52)

This invention relates to self-lubricating time mechanisms in general, and to permanent self-lubricating provisions therefor in particular.

Permanent lubricating provisions for this purpose have become known heretofore. These previous lubricating provisions rely on a sealed housing which encloses the entire movement of a timepiece or other timing device, and serves as a reservoir for a supply of lubricant, and on capillary passages in the opposite movement plates through which lubricant is drawn from the supply to the journalled staffs as needed by the latter. These previous lubricating provisions are objectionable in several important respects. Thus, a sealed-in movement of this kind adds considerably to the cost of a timepiece by requiring a special housing and other additional parts which a conventional non-sealed movement does not require, and by complicating the assembly of the movement. Also, the amount of the lubricant supply should for economic and other practical reasons not be greatly in excess of that required for long-time or even life-time lubrication of the movement, and such an amount of lubricant is very small in comparison with the capacity of the movement-enclosing housing, with the result that the capillary passages in the movement plates will be in communication with the lubricant supply only when the timepiece is in a certain predetermined position or deviates only slightly therefrom. Accordingly, such a timepiece would satisfactorily perform for any length of time only if properly positioned, and would not permit substantial permanent deviation from this position. Further, the lubricant in the sealed housing may flow unrestrictedly therein with every change in position of the timepiece so that normally non-lubricated operating parts of the movement may well be wetted by the lubricant and become temporarily lubricated when the timepiece is being handled, with the result that the performance of the timepiece will vary perceptibly until these parts become dry. The unrestricted flow of the lubricant in the sealed housing is further objectionable in that the lubricant will, on repeated handling of the timepiece, pick up the dirt and dust from all parts of the movement. Hence, unless the movement is cleaned with special care prior to its assembly with the sealed housing, the lubricant in the latter will soon be contaminated. Of even greater objection is the imperative arrangement of the staffs of the sealed-in movement so that their ends extend at least to, and preferably into, the narrow capillary spaces in the movement plates so as not to break the lubricant film therein from which the journalled staffs are adapted to draw lubricant as needed. Thus, it is imperative that the staffs have exceptionally close tolerances in order that their ends may neither break the lubricant films in the capillary spaces in the movement plates nor become jammed against the adjacent walls of these capillary spaces. These most exacting demands of accuracy of the staffs and also of the widths of the capillary passages in the movement plates makes efficient and low-cost mass production of these permanent self-lubricating movements an impossibility.

It is an important object of the present invention to provide for the movement of a timepiece or other timing device permanent self-lubricating provisions which have none of the above-mentioned shortcomings of the previous lubricating provisions of this type.

Thus, it is an object of the present invention to have leakproof provisions wholly contained in a non-sealed movement of a timepiece or other timing device for self-lubrication of the journals of the various staffs from a permanent supply of lubricant.

It is another object of the present invention to have in the non-sealed movement of a timing device lubricating provisions of the aforementioned type of which the permanent lubricant supply is held isolated from the movement parts, and lubricant is drawn by capillary attraction from the supply only as needed for lubricating the staff bearings, so that the lubricant may under no circumstances wet any of the normally non-lubricated operating parts of the movemnt or pick up dirt and dust from these parts.

Another object of the present invention is to have in the movement of a timing device lubricating provisions of the aforementioned type of which lubricant will assuredly be drawn by capillary attraction from the supply to the staff bearings as needed, despite the usual tolerances in the lengths of the pillars of the movement and even exceptional tolerances in the staff lengths.

It is a further object of the present invention to form the aforementioned lubricating provisions and the journal bearings for the staffs at the opposite end plates of the movement as separate self-contained bearing aggregates or units which may readily be assembled with the other parts of the movement, and may quickly be charged with a permanent or long-time supply of lubricant at any time after the movement has been assembled.

It is another object of the present invention to provide each of the aforementioned bearing units with a sealed lubricant reservoir and capillary passages which form the sole communication between the reservoir and the staff bearings, so that the lubricant supply in the reservoir will be protected from outside dirt and dust and may even last for the life of the movement, and each bearing unit is leakproof even when the movement is subjected to such normal conditions of disturbance as shock or vibration, acceleration or deceleration, or change in position.

A further object of the present invention is to arrange the staff bearings and lubricant reservoirs of the aforementioned bearing units so that the staffs have intermediate lengths thereof journalled in the bearings and extend with their ends into the adjacent reservoirs with some end play, so that the reservoirs may serve as lubricated thrust bearings for the staffs.

Another object of the present invention is to have the reservoirs of the aforementioned bearing units of such capacities that they together hold not much more than the relatively small quantity of lubricant required for long-time or even life-time lubrication of the staffs of the movement, thereby eliminating the waste of unused lubricant.

It is a further object of the present invention to form the lubricant reservoir of each of the aforementioned bearing units also as a capillary space which together with the capillary passages to the staff bearings hold an uninterrupted lubricant film of sufficient extent to afford a long-time lubricant supply from which lubricant may be drawn as needed for the proper lubrication of the staff bearings.

Another object of the present invention is to provide the capillary lubricant reservoir of each of the aforementioned bearing units with depressions or wells which hold additional lubricant to keep the lubricant film at maximum capacity, and which are so spaced that they will not break the lubricant film that extends uninterruptedly to the staff bearings.

It is a further object of the present invention to provide each of the aforementioned bearing units with a small duct which provides communication between the outside of the unit and a capillary passage therein, and serves for the introduction of lubricant into the unit, and which may remain open without adverse effect on the lubricant film or without giving rise to lubricant leakage from the unit.

Still another object of the present invention is to provide each of the aforementioned bearing units with another duct or ducts which provide communication between a capillary passage and the lubricant reservoir of the unit to expedite the complete charging of the latter with lubricant.

Other objects and advantages will appear to those skilled in the art from the following, considered in conjunction with the accompanying drawings.

In the accompanying drawings, in which certain modes of carrying out the present invention are shown for illustrative purposes:

Figure 2:
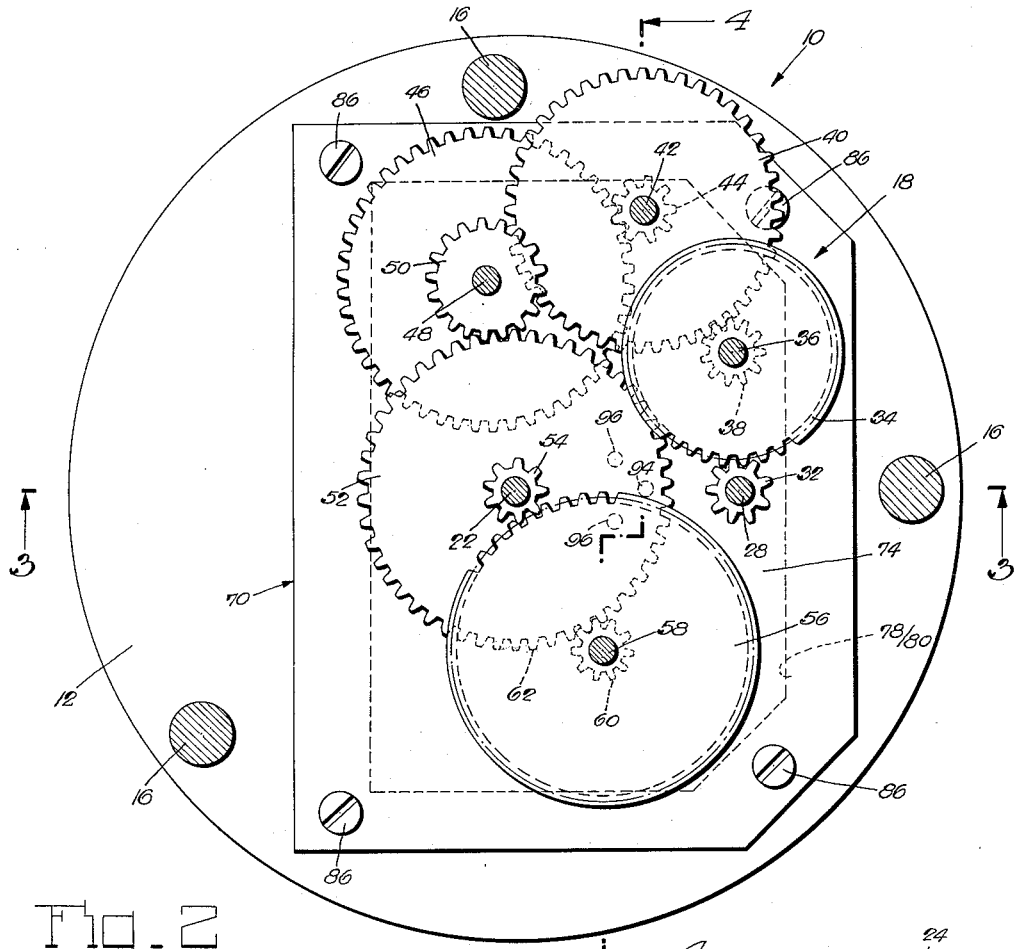
Fig. 2 is a transverse section through the time mechanism, taken substantially on the line 2—2 of Fig. 1.

Figs. 3 and 4 are cross-sections taken on the lines 3—3 and 4—4, respectively, of Fig. 2;

Figs. 5 and 6 are fragmentary sections of time mechanisms embodying the present invention in different modified forms, respectively;

Fig. 7 is a section similar to Fig. 4, and showing a further modified embodiment of the present invention; and Fig. 8 is a fragmentary section showing another modified form of the invention.

Figure 1:
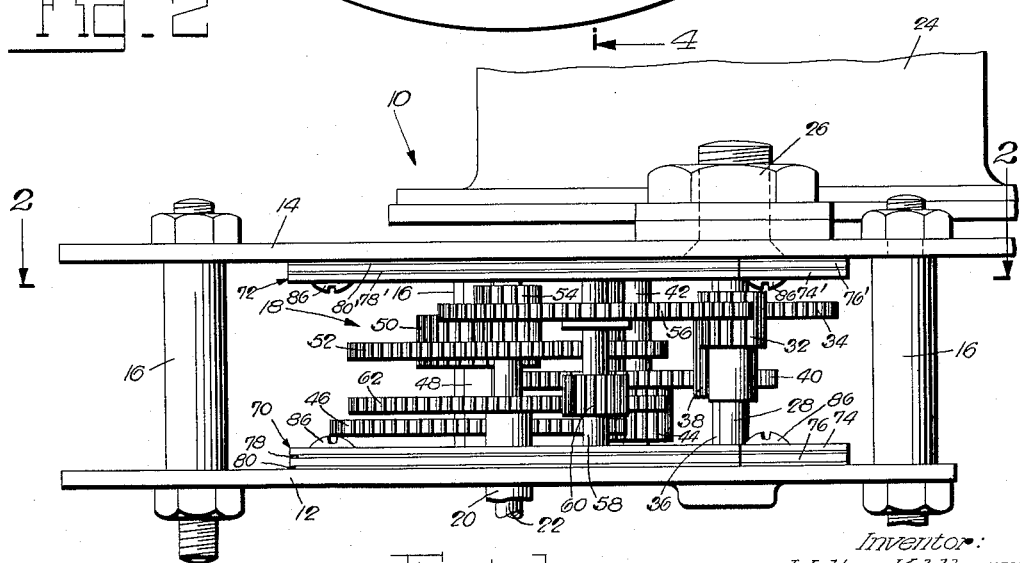
Fig. 1 is a side elevational view, partly broken away, of a time mechanism embodying the present invention.

Referring to the drawings, and more particularly to Figs. 1 and 2 thereof, the reference numeral 10 designates the movement of a timepiece. It is to be understood, however, that the present invention may with equal advantage to used in time mechanisms other than the movements of timepieces, and that the present movement is disclosed only by way of example. The movement 10 comprises the usual end or movement plates 12 and 14 which are held in accurately spaced parallel relation by a plurality of pillars 16. Interposed between the movement plates 12 and 14 is suitable reduction gearing 18 for drivingly connecting the hour and minute shafts 20 and 22, respectively, of the movement with the prime mover 24 thereof. The prime mover 24 is, in the present instance, a conventional alternating current motor of the synchronous type which may suitably be mounted at 26 on the movement plate 14 (Fig. 1), and has a rotor shaft 28 which extends through an aperture 30 in said movement plate into the space between both movement plates (Fig. 3).

The gearing 18 comprises, in the present instance, a driving pinion 32 which is carried by the rotor shaft 28 and permanently meshes with a larger gear 34 on a staff 36. Also carried by the staff 36 is a smaller gear 38 that is in permanent mesh with a larger gear 40 on a staff 42 which also carries a smaller gear 44. Permanently meshing with the gear 44 is a larger gear 46 on a staff 48 which also carries a smaller gear 50 that is in permanent mesh with a larger gear 52 on the minute shaft 22 of the movement. Also carried by the minute shaft 22 is a smaller gear 54 which is in permanent mesh with a larger gear 56 on a staff 58 which also carries a smaller gear 60 that is in permanent mesh with a larger gear 62 on the hour shaft 20 of the movement (Fig. 1). The ratio of the described reduction gearing 18 of the instant movement is such that, at the rated synchronous speed of the motor 24, the minute shaft 22 will during each minute pass through one-sixtieth of a revolution and the hour shaft 20 will during each hour pass through one-twelfth of a revolution. The movement described so far may be conventional in every respect and forms no part of the present invention.

In accordance with the present invention, separate bearing units 70 and 72 are provided on the movement plates 12 and 14, respectively, for the various staffs, as well as the hour and minute shafts and the motor shaft, of the movement. Since the bearing units 70 and 72 are identical except insofar as pointed out later, only one of them, namely the bearing unit 70, will be described in detail. Referring now more particularly to Figs. 2, 3 and 4, the bearing unit 70 comprises, in the present instance, superposed plates 74 and 76 which are held in spaced parallel relation with each other and with the adjacent movement plate 12 by spacers 78 and 80, respectively. The spacers 78 and 80 are of the frame-like shape shown in dotted lines in Fig. 2, and define between the plates 74, 76 and 12 spaces 82 and 84, respectively, which are peripherally sealed by these spacers (Figs. 3 and 4). The plates 74 and 76 and spacers 78 and 80 are securely mounted in position on the movement plate 12 by screws 86, for instance. The spacers 78 and 80 are of such thickness that the spaces 82 and 84 are capillaries, each being adapted to hold a lubricant supply film. Provided in the plates 74 and 76 are spaced sets of axially aligned apertures 90 and 92, respectively, of which the apertures of each set receive an end of one of the described staffs of the movement. Thus, Fig. 4 shows two of the spaced sets of apertures 90 and 92 which receive the ends of the staffs 42 and 58, respectively, but it is to be understood that the ends of the remaining staffs are received in similar sets of apertures 90 and 92 in the plates 74 and 76. Each of the apertures 90 in the outer or "bearing" plate 74 has preferably a bearing fit with the staff therein, so that each staff has relatively small capillary clearance from its "bearing" aperture 90. The apertures 92 in the inner or "capillary" plate 76, while preferably of slightly larger diameter than the aligned bearing apertures 90 as shown in exaggerated fashion in Fig. 4, are nevertheless of such dimensions that they have no more than capillary clearance from the staffs which project thereinto. Accordingly, the lubricant supply film in the capillary space 82 will extend unbrokenly to the bearing apertures 90 into which lubricant is drawn from the supply film as needed for proper lubrication of the staff journals therein.

The plates 74' and 76' of the opposite bearing unit 72 are also provided with sets of axially aligned apertures 90' and 92', respectively, which are arranged to be in axial alignment with the sets of apertures 90 and 92 in the other bearing unit 72, and receive the other ends of the staffs. The apertures 90' and 92' in the bearing unit 72 are dimensioned similarly as the apertures 90 and 92, respectively, in the bearing unit 70, i. e., the bearing apertures 90' being preferably slightly smaller in diameter than the apertures 92' and having bearing fits with the respective staffs, but both apertures 91' and 92' being dimensioned to have no more than capillary clearance from the respective staffs so as to conduct the lubricant supply film in the capillary space 82' unbrokenly to the bearing apertures 90'.

In order to charge the capillary spaces 82 and 84 in the bearing unit 70 with lubricant, the bearing plate 74 is provided with a readily accessible filler duct 94 through which to introduce the lubricant (Figs. 2, 3 and 4). The filler duct 94 need not be covered and may remain exposed at all times. To expedite the charging of both capillary spaces 82 and 84 with lubricant through the filler duct 94, the inner capillary plate 76 is also provided with one or more ducts 96 which are preferably out of alignment with the filler duct 94 (Fig. 2). In thus providing the additional ducts 96 in the inner plate 76, the lubricant for the capillary space 84 may bypass the extensive capillary path through the space 82 and pass more or less directly into the capillary space 84. The plates 74' and 76' of the opposite bearing unit 72 are provided with similar ducts 94' and 96' for quickly charging the capillary spaces 82' and 84' with lubricant.

Fig. 8 shows modified provisions for charging the capillary spaces 82 and 84 in the bearing unit 70 with lubricant. Thus, lubricant may be introduced into the capillary space 84 through a hole 93 in the movement plate 12, and lubricant thus introduced in the capillary space 84 may flow quickly to the other capillary space 82 through holes 96″ in the capillary plate 76. The bearing plate 74 is also provided with a hole 95 which serves as a vent. The other bearing unit 72 may have similar modified provisions for charging the capillary spaces 82′ and 84′ with lubricant.

The staffs 36, 42, 48 and 58 have flat ends with the edges preferably slightly broken as shown in exaggerated fashion in Fig. 4, and their lengths are such that they will definitely project with their ends into the apertures 92 and 92′ in the bearing units 70 and 72, respectively, under any conditions, so that they may never break the lubricant films in the spaces 82 and 82′ from which lubricant is drawn directly into the bearing apertures 90 and 90′ as needed. Thus, in order to assure proper and unfailing lubrication of the staff bearings at least from the lubricant supply films in the capillary spaces 82 and 82′, it is merely necessary that the staff ends project into the respective apertures 92 and 92′, but not to the full axial extent of the latter. Accordingly, the staffs may have end play in the bearing units 70 and 72 to such an extent that staffs of even considerable lengthwise tolerances may be used without adversely affecting the proper lubrication of their journal bearings.

While some of the journalled staffs may have end play to such an extent that they break the lubricant film in either or both capillary spaces 84 and 84′ at their respective apertures 92 and 92′, such as the staff 58 in Fig. 4, for instance, another staff or staffs may be of the right lengths to extend the capillary gaps between them and their respective apertures 92 and 92′ to the capillary spaces 84 and 84′, respectively, such as the staff 42 in Fig. 4, for instance. Accordingly, even if the movement would be used in the disposition shown in Fig. 4, i. e. with the movement plates 12 and 14 disposed horizontally, and would be left undisturbed in this disposition for a long time, the lubricant films in the adjacent capillary spaces 82, 84 and 82′, 84′ in the respective bearing units 70 and 72 would nevertheless be and remain continuous with each other and afford proper and continuous lubrications of the staff bearings.

Movements of timepieces are usually so disposed that the movement plates are upright. In that case, even if all the journalled staffs should have such end play as to break the lubricant film in either capillary space 84 or 84′ at the respective apertures 92 or 92′, the staffs will nevertheless be properly and continuously lubricated in their journal bearings until the lubricant supply films in the bearing units 70 and 72 are substantially simultaneously exhausted, if ever. This is due to the fact that the staffs will inevitably creep axially from one movement plate against the other movement plate, and vice versa, in the course of normal running of the movement, with the result that the capillary connections between the lubricant films in the spaces 82, 84 and 82′, 84′ in the respective bearing units 70 and 72 will even under the most unfavorable conditions be reestablished from time to time through the apertures 92 and 92′, respectively, so that the lubricant films in the adjacent spaces 82, 84 and 82′, 84′ may replenish one another as needed. Even ordinary handling of the timepiece from time to time would impart to the staffs sufficient end shake to bring about rejoinder of the lubricant films in the adjacent capillary spaces 82, 84 and 82′, 84′ in the respective bearing units 70 and 72, if broken, and thus assure proper and continuous lubrication of the staff bearings for a long time. It therefore follows from the preceding that proper and continuous lubrication of the staff bearings is, under any and all circumstances and even despite considerable lengthwise tolerances of the staffs, assured until the lubricant supply films in the bearing units 70 and 72 are substantially simultaneously exhausted, if ever.

In normal running of the movement, either or both movement plates 12 and 14 will also serve as end thrust plates for the staffs. Further, since the ends of the staffs are flat, the same as the movement plates, and since the staffs have no more than capillary clearance from the apertures 92 and 92′ in the capillary plates 76 and 76′ of the respective bearing units 70 and 72, it stands to reason that lubricant from the films in the capillary spaces 84 and 84′ will at least at times, be drawn between the staff ends and adjacent portions of the movement plates 12 and 14, respectively, to thus effectively lubricate also the end thrust bearings of the staffs.

The lubricant supply afforded by the lubricant films in the bearing units 70 and 72 is in any event a longtime supply, and may even last for the life of the timepiece, especially since the capillary spaces in each bearing unit are well sealed against dust and other external impurities. To afford an even more adequate lubricant supply, the capillary spaces 84 and 84′ in the bearing units 70 and 72, respectively, are preferably somewhat wider than the respective capillary spaces 82 and 82′ therein, so as to hold a somewhat thicker lubricant film in the spaces 84 and 84′. Since the apertures 90 and 90′ in the bearing units 70 and 72, respectively, have bearing fits with the respective staff journals as described, and since the lubricant films in these bearing units are capillary films and are effectively sealed in their respective bearing units 70 and 72, the latter are also substantially leakproof even when the movement is subjected to such normal conditions of disturbance as shock or vibration, acceleration or deceleration, or change in position.

The rotor shaft 28 of the motor 24 is also journalled in the bearing units 70 and 72. To this end, the plates 74 and 76 of the bearing unit 70 are provided with further aligned apertures 100 and 102, respectively, of which the aperture 100 has preferably a bearing fit with the rotor shaft 28, and the aperture 102 may be slightly larger but has no more than capillary clearance from the rotor shaft (Fig. 3). The plates 74′ and 76′ of the opposite bearing unit 72 are provided with similarly dimensioned apertures 100′ and 102′, respectively. In order to facilitate the assembly of the motor 24 with the movement, without requiring undue accuracy of the rotor shaft 28 insofar as its length is concerned, and without jeopardizing its proper lubrication in the bearing unit 70, the rotor shaft 28 is conveniently made of such length, allowing for considerable tolerances, that it extends with its end considerably beyond the bearing unit 70 (Fig. 3), the adjacent movement plate 12 being formed with a depression 104 into which the end of rotor shaft 28 may extend with clearance.

One end of the minute shaft 22 is, in the present instance, journalled in a bearing aperture 106 in the plate 74′ of the bearing unit 72 (Fig. 3), and extends into an aligned aperture 108 in the adjacent capillary plate 76′ with no more than capillary clearance therefrom. The hour shaft 20 is in this instance a sleeve through which the other end of the minute shaft 22 extends and in which it is journalled. The hour shaft or sleeve 20 is journalled in a bearing aperture 110 in the plate 74 of the bearing unit 70, and extends through aligned apertures 112 and 114 in the adjacent capillary plate 76 and movement plate 12, respectively. The aperture 112 in the capillary plate 76, while preferably somewhat larger in diameter than the adjacent bearing aperture 110, has no more than capillary clearance from the hour shaft 20, while the aperture 114 in the movement plate 12 may be dimensioned to have suitable, preferably close capillary clearance from the hour shaft 20.

Figs. 5 and 6 show modified journal bearings for the rotor shaft 28 in the bearing 72. Thus, the aperture 102′ in the capillary plate 76' of the bearing unit 72 may have a bearing fit with the rotor shaft 28 (Fig. 5), while the apertures 100' and 30' in the bearing plate 74' and movement plate 14, respectively, may be larger than the aperture 102' but will have no more than capillary clearance from the rotor shaft. In Fig. 6, the aperture 100" in the bearing plate 74' may have a bearing fit with the rotor shaft 28, while the apertures 102" and 30' in the capillary plate 76' and movement plate 14, respectively, may be larger than the aperture 100" but will have no more than capillary clearance from the rotor shaft. Of course, the bearing for the only other shaft which in this instance extends through a movement plate, i. e. the hour shaft 20 which extends through the movement plate 12 (Fig. 3), may be modified similarly as the bearing for the rotor shaft in either Fig. 5 or Fig. 6.

Following are dimensions, given by way of example only and by no means by way of limitation, of the capillary spaces and gaps in bearings which performed satisfactorily in movements. Thus, the widths of the capillary spaces between the bearing and capillary plates of these bearings varied between .005" and .010", while the capillary spaces between the capillary plates and adjacent movement plates were either of the same widths as the spaces between the bearing and capillary plates, or wider by as much as .002". The capillary plates of these bearing units were from .010" to .030" thick, while the capillary gaps between the apertures in the capillary plates and the respective staffs were about .003" on each side of a staff.

While the capillary spaces 82, 84 and 82', 84' in the respective bearing units 70 and 72 are shown sealed circumferentially by the respective spacers 78, 80 and 78', 80', it is fully within the scope of the present invention to leave these capillary spaces circumferentially exposed by having separate spacers located at suitable distances from each other between the bearing and capillary plates of each bearing unit and between the capillary plate of each bearing unit and the adjacent end plate of the movement. Even with the capillary spaces in the bearing units 70 and 72 thus exposed circumferentially, the latter will nevertheless be substantially leakproof if not subjected to excessive disturbances from shock or vibration, acceleration or deceleration, or quick change in position, because the lubricant supply is held by capillary attraction in these bearing units. Of course, the sealed condition of the capillary spaces in these bearing units, as hereinbefore described and shown in the drawings, is preferable from the standpoint of leak prevention of lubricant from the movement under conditions of disturbance, and the use for satisfactory staff lubrication of the available capillary lubricant supply in uncontaminated condition for an especially long time, or even for the lifetime of the movement.

Reference is now had to Fig. 7 in which are shown several modifications of the invention. Thus, instead of interposing separate spacers between the flat bearing, capillary and movement plates of each bearing unit is in the foregoing example, the bearing and capillary plates 120 and 122, respectively, of each of the bearing units 70' and 72' have offset circumferential margins 124 and 126, respectively, which in their superposed mounted condition on the adjacent movement plates 12' and 14', respectively, leave the remaining portions of the bearing and capillary plates sufficiently spaced from each other and from the adjacent movement plates to define the sealed capillary spaces 128 and 130.

A further modification shown in Fig. 7 lies in the formation in any one of the plate surfaces of each bearing unit which bounds a capillary space therein, of a relatively shallow depression or depressions 132 which serve as reservoirs for further supply lubricant from which to replenish the lubricant supply film in the adjacent capillary space. In the present instance, the capillary plate 122 of each bearing unit 70' and 72' is shown provided in each face thereof with a plurality of depressions 132 which necessarily are so spaced from each other and from the apertures in said capillary plate as not to break the capillary films in the adjacent spaces 128 and 130, respectively, after the lubricant in these depressions has been used up. Of course, these lubricant supply depressions or wells 132 may be provided in any other plate surface or surfaces, or in all plate surfaces, which bound the capillary spaces in each bearing unit.

The instant bearing provisions secure many important advantages. Thus, the complementary bearing units are wholly contained in a non-sealed movement of a timepiece or other timing device, and each bearing unit is of the self-lubricating type and holds a long-time supply of lubricant without leakage under ordinary conditions. The lubricant supplies in the bearing units are even held isolated from the movement parts and lubricant is drawn therefrom, by capillary action, to the staff bearings only as needed for proper lubrication of the staff journals therein, wherefore no lubricant will wet any of the normally non-lubricated operating parts of the movement or pick up dirt and other impurities from these parts. Further, due to the deliberate extension of the staff ends beyond their respective journal bearings and immediately adjacent capillary spaces in the bearing units, lubricant will assuredly be drawn by capillary action from the lubricant supplies in these bearing units to the staff bearings as needed, despite even exceptional tolerances in the staff lengths. The instant bearing units may also be readily assembled with the other parts of a movement, and each may quickly be charged with a long-time supply of lubricant at any time after the movement has been assembled. Further, each of the instant bearing units may have its lubricant reservoir sealed and in communication with the staff bearings only through capillary passages, so that the lubricant supply in each reservoir will be protected from outside dirt and other impurities and may even last for the life of the movement, and each bearing unit is leakproof even when the movement is subjected to conditions of disturbance, such as shock or vibration, acceleration or deceleration, or change in position. Also, the instant bearing units are so arranged that intermediate lengths of the staffs are received in their respective journal bearings, and the ends of the staffs extend into the lubricant reservoirs of these bearing units with some end play, so that the reservoirs will also serve as lubricated thrust bearings for the staffs. The lubricant reservoirs of the instant bearing units are also of such capacities that they together hold not much more than the relatively small quantity of lubricant required for long-time or even life-time lubrication of the staff journals in their bearings, thus eliminating the waste of unused lubricant. The instant bearing units are particularly noteworthy in that the long-time or even lifetime supply of lubricant for a movement is stored in these units in the form of capillary films which remain unbroken and from which lubricant will assuredly be drawn under all conditions for proper lubrication of the journal bearings, until these lubricant supply films are exhausted, if ever. The lubricant-storage capacity of each bearing unit may further be increased by providing the capillary spaces therein with spaced depressions or wells which hold additional lubricant from which to replenish the capillary lubricant film as needed. Also, the storage of the entire lubricant supply in each bearing unit in the form of a continuous capillary lubricant film facilitates the charging of the unit with lubricant, in that the lubricant may readily be introduced in the unit through a duct which need not be closed at any time to prevent leakage of lubricant therethrough. Quick-charging of each bearing unit with lubricant is further accomplished by providing additional internal communication ducts which accelerate the formation of the continuous capillary lubricant film through its considerable areal extent.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A self-lubricating shaft bearing, comprising a plurality of adjacent walls having confronting faces spaced from each other to define between successive walls capillary spaces, respectively, each for holding a lubricant supply film, all of said walls having aligned bearing apertures, respectively, and a wall other than an endmost one having within its circumference and in each face thereof depressions which are so spaced from each other and from said apertures as to preserve the adjacent lubricant supply film unbroken, said depressions being adapted to hold an additional lubricant supply from which to replenish the lubricant supply films.

2. In a movement of a timepiece, the combination of pillar-spaced end plates; a plurality of staffs; and self-lubricating staff bearings comprising opposite pairs of bearing plates mounted in superposed fashion on the inner faces of the end plates, respectively, the bearing plates of each pair being spaced from each other and from the adjacent inner face of the respective end plate to define therebetween capillary spaces, respectively, each for holding a lubricant supply film, and the bearing plates of each pair being provided with sets of aligned apertures, respectively, which are in axial alignment with the apertures of the sets, respectively, in the bearing plates of the opposite pair, the apertures of the axially aligned sets receiving said staffs, respectively, with capillary clearance therefrom, and said end plates having filler holes, respectively, through which to introduce lubricant into the capillary spaces.

3. The combination in a movement of a timepiece as set forth in claim 2, in which the bearing plate of each pair nearest the respective end plate is also provided with a hole for quick-charging the adjacent capillary space most remote from the respective end plate with lubricant introduced through said filler hole in the latter.

4. The combination in a movement of a timepiece as set forth in claim 2, in which said capillary spaces are circumferentially sealed, and the confronting bearing plates of said pairs are provided with vent holes, respectively.

5. The combination in a movement of a timepiece as set forth in claim 2, in which said capillary spaces are circumferentially sealed, the bearing plate of each pair nearest the respective end plate is also provided with a hole for quick-charging the adjacent capillary space most remote from the respective end plate with lubricant introduced through said filler hole in the latter, and the confronting bearing plates of said pairs are provided with vent holes, respectively.

6. The combination in a movement of a timepiece as set forth in claim 2, in which said capillary spaces are circumferentially sealed, the bearing plate of each pair nearest the respective end plate is also provided with a hole for quick-charging both adjacent capillary spaces with lubricant through said filler hole in the respective end plate, and the confronting bearing plates of said pairs are provided with vent holes, respectively, said holes in each end plate and adjacent bearing plates, respectively, being disaligned from each other.

References Cited in the file of this patent

UNITED STATES PATENTS

| | | |
|---|---|---|
| 1,456,082 | Warren | May 22, 1923 |
| 1,563,380 | Kunkle | Dec. 1, 1925 |
| 2,219,388 | Hansen et al. | Oct. 29, 1940 |
| 2,281,493 | Hammond | Apr. 28, 1942 |
| 2,332,634 | Hansen et al. | Oct. 26, 1943 |